United States Patent [19]
Evoy et al.

[11] Patent Number: 5,958,020
[45] Date of Patent: Sep. 28, 1999

[54] REAL TIME EVENT DETERMINATION IN A UNIVERSAL SERIAL BUS SYSTEM

[75] Inventors: David R. Evoy; Lonnie Goff, both of Tempe; Peter Chambers, Phoenix; Mark Eidson, Tempe, all of Ariz.

[73] Assignee: VLSI Technology, Inc., San Jose, Calif.

[21] Appl. No.: 08/960,483

[22] Filed: Oct. 29, 1997

[51] Int. Cl.$^6$ .............................. G06F 13/14; G06F 13/20
[52] U.S. Cl. .................................. 710/3; 710/15; 710/30; 710/46; 710/63
[58] Field of Search .............................. 710/1, 3, 15, 18, 710/30, 46, 47, 63

[56] References Cited

U.S. PATENT DOCUMENTS

| | | | |
|---|---|---|---|
| 5,535,251 | 7/1996 | Sugawara | 375/356 |
| 5,717,762 | 2/1998 | Aihara et al. | 380/49 |
| 5,812,625 | 9/1998 | Potier et al. | 377/20 |
| 5,890,015 | 3/1999 | Garney et al. | 395/882 |

*Primary Examiner*—Thomas C. Lee
*Assistant Examiner*—Rehana Perveen
*Attorney, Agent, or Firm*—Wagner, Murabito & Hao

[57] ABSTRACT

The system of the present invention comprises a system for implementing a real time capability in peripheral devices. The system of the present invention functions with a computer system including a processor, a memory, and a video controller, each coupled to a system bus. A USB (universal serial bus) controller is also coupled to the system bus for interfacing peripheral devices on a USB cable to the computer system. A first and second register are included in the USB controller for storing a controller frame number and a controller frame remaining, and a second and third register are included in the peripheral device for storing a device frame number and a device frame remaining. The peripheral device is coupled to the USB controller via a USB cable. A screen reference register is coupled to receive the controller frame number and the controller frame remaining from the USB controller and is coupled to receive a reference signal from a video controller. In response to receiving the reference signal, the screen reference register stores the controller frame number and the controller frame remaining. The peripheral device transmits the device frame number and the device frame remaining to the computer system in response to the occurrence of an event. The controller frame remaining and the controller frame number are subsequently compared with the device frame remaining and the device frame number to determine a computer system time (e.g., a real time) of the occurrence of the event.

19 Claims, 7 Drawing Sheets

REAL TIME EVENT DETERMINATION IN A UNIVERSAL SERIAL BUS SYSTEM

TECHNICAL FIELD

The present invention relates to the field of computer systems that implement a Universal Serial Bus (USB). More specifically, the present invention relates to accurately determining the specific time of occurrence of a real-time event that is monitored by a peripheral device coupled to a Universal Serial Bus.

BACKGROUND ART

The universal serial bus (USB) is an industry standardized bus architecture developed to provide efficient, cost effective connections of peripherals to a computer system. USB is designed to efficiently integrate many various peripheral devices (e.g., up to 127 peripheral devices per USB port) to the computer system. Such peripheral devices could include, for example, a light pen, keyboard, mouse, printer, scanner, and the like. USB is increasingly becoming the system of choice for connecting peripheral devices to computer systems.

USB differs from previous expansion bus systems. One difference is that USB connects peripheral devices to the computer system without consuming the input output resources of the computer system. Unlike previous expansion bus systems, peripheral devices designed to function with USB do not require memory or input output address space and do not require interrupt request lines from the computer system. This increases the number of peripheral devices the computer system is able to reliably support. USB also provides a single connector type to connect peripheral devices designed to function with USB (hereafter USB peripheral devices). Each USB peripheral device connects to a standard USB connector. Additionally, USB provides the ability to couple a number of peripheral devices to a single USB connector. USB also provides for automatic USB peripheral device configuration and eliminates computer system resource conflicts. These, and other, advantages allow USB to simplify and ease the process of adding peripheral devices to a computer system, providing a "plug and play" system which satisfies the requirements of the users.

There exits a problem, however, in that while USB provides numerous benefits to users, USB does not currently support the use of real time, hardware supported interrupts of the CPU by the connected USB peripheral devices. The USB specification does not provide the capability for a USB peripheral device to interrupt the CPU of the computer system. Instead, each connected USB peripheral device is polled in successive 1 ms intervals (e.g., frames) by a USB controller within the computer system. When a connected USB peripheral device requires service (e.g., a data transfer from an internal buffer to the computer system), it waits until the next 1 ms interval, or frame, in which it is polled to communicate the required service to the USB controller. In this manner, each connected USB peripheral device is polled to determine whether it requires service.

As a result, USB peripheral devices have no real time capability. Real time capability as used herein is defined as the ability to accurately determine the actual time of an event's occurrence with respect to the computer system clock. A USB peripheral device cannot use an interrupt the CPU of the computer system to thereby inform the computer system of the occurrence of the event. The USB peripheral device, instead, waits until it is polled to communicate with the computer system via the USB controller.

Another reason USB peripheral devices have no real time capability is that no precise timing information is communicated across the USB interface. USB peripheral devices communicate serially via 1 ms frames to the USB controller. The USB controller, in turn, interfaces the USB peripheral devices with the host computer system. As a result, the 1 ms USB frames are asynchronous and completely indeterminate with respect to the CPU of the computer system. This further precludes the accurate determination of the specific instant in time that an event occurred within a peripheral device.

This lack of real-time capability precludes the use of certain types of peripheral devices as USB peripheral devices. For example, a light pen device used in conjunction with a computer-aided design (CAD) program requires real-time capability to operate properly. Therefore, a light pen cannot operate properly coupled to a prior art computer system that employs the USB architecture. Another type of device, that is closely related to a light pen, that cannot operate properly coupled to USB architecture is an aiming device used in conjunction with a software game in which the game player aims and shots at targets on the display screen and the game responds in some suitable manner (e.g., a light gun). Other examples of peripheral devices which require real-time capability include industrial applications that control machinery or any type of system control in which the host processor needs to be informed immediately upon the occurrence of an event. These types of applications require the addition of a real-time capability to the USB architecture in order to properly function.

Thus, what is required is a method and system implementing a real time capability within the USB architecture. The required system should allow the USB architecture to have real-time capability in determining the actual time of an event's occurrence within a USB peripheral device. The present invention provides a novel solution to the above requirements.

DISCLOSURE OF THE INVENTION

The present invention provides a method and system for implementing a real time capability within the USB architecture. The system of the present invention provides the USB architecture with a real-time capability in determining the actual time of the occurrence of an event within a USB peripheral device.

In one embodiment, the system of the present invention functions with a computer system including a processor, a memory, and a video controller, each coupled to a system bus. A USB (universal serial bus) controller is coupled to the system bus for interfacing peripheral devices on a USB cable to the computer system. A first and second register are included in the USB controller for storing a controller frame number and a controller frame remaining, and a third and fourth register are included in the peripheral device for storing a device frame number and a device frame remaining. The peripheral device is coupled to the USB controller via a USB cable. A screen reference register is coupled to receive the controller frame number and the controller frame remaining from the USB controller and is coupled to receive a reference signal from a video controller.

In response to receiving the reference signal, the screen reference register stores the controller frame number and the controller frame remaining. The peripheral device transmits the device frame number and the device frame remaining to the computer system in response to the occurrence of an event. The controller frame remaining and the controller frame number are subsequently compared with the device frame remaining and the device frame number to determine a computer system time (e.g., a real time) of the occurrence of the event.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
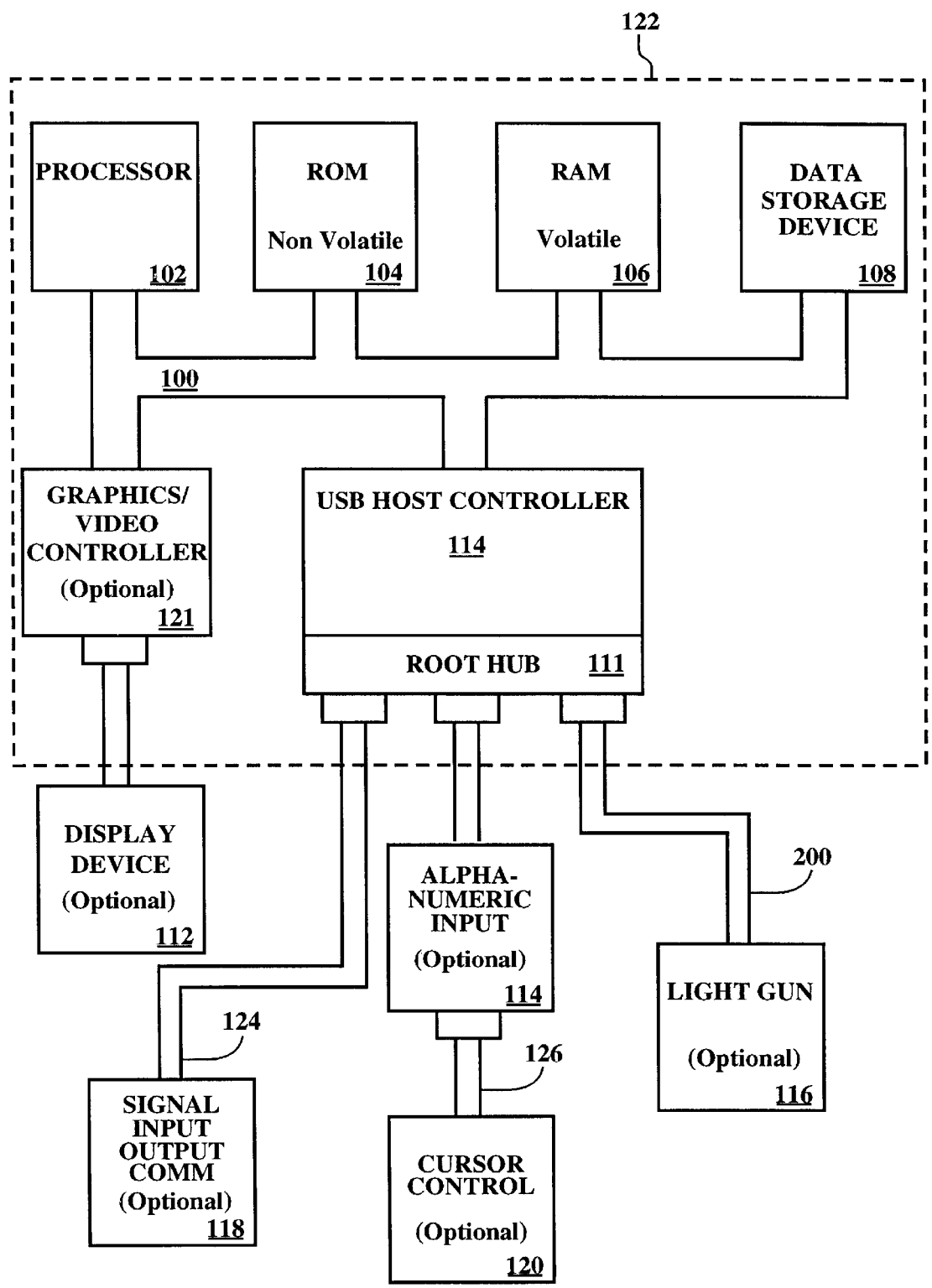
FIG. 1 shows a computer system in accordance with one embodiment of the present invention.

Reference will now be made in detail to the preferred embodiments of the invention, a method and system for real time event determination within a universal serial bus system, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, step, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "storing" or "processing" or "mapping" or "executing" or the like, refer to the action and processes of a computer system (e.g., computer system 122 of FIG. 1), or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention provides a method and system for implementing a real time capability within the USB architecture. The system of the present invention provides the USB architecture with a real-time capability in determining the actual time of the occurrence of an event within a USB peripheral device. The present invention and its benefits are described in greater detail below.

Referring to FIG. 1, a computer system 122 in accordance with one embodiment of the present invention is shown. Within the following discussions of the present invention, certain processes (e.g., process 700) and steps are discussed that are realized, in one embodiment, as a series of instructions (e.g., software routine) that reside within computer readable memory units of system 122 and executed by processors of system 122. When executed, the instructions cause the computer system 122 to perform specific actions and exhibit specific behavior which is described in detail to follow.

FIG. 1 shows a block diagram of computer system 122 utilizing a USB architecture in accordance with the present invention. In general, computer system 122 used by an embodiment of the present invention comprises an address/data bus 100 for communicating information, one or more host processors 102 coupled with bus 100 for processing information and instructions, a computer readable volatile memory unit 106 (e.g. random access memory unit, static RAM, dynamic RAM, etc.) coupled with bus 100 for storing information and instructions for the host processor 102, a computer readable non-volatile memory unit 104 (e.g., read only memory unit, programmable ROM, flash memory, EPROM, EEPROM, etc.) coupled with bus 100 for storing static information and instructions for the host processor 102, a computer readable data storage device 108 such as a magnetic or optical disk and disk drive (e.g., hard drive or floppy diskette) coupled with bus 100 for storing information and instructions, a USB controller 110 coupled to bus 100 to provide an interface to control all the peripheral devices connected to root hub 111, and a root hub 111 coupled to USB controller 110 to provide connection ports to couple peripheral devices to computer system 122.

The USB controller 110 is coupled to a hub of multiple USB ports, referred to as the root hub 111. This hub is referred to as the root hub because it is the first level of hubs within the USB architecture. Each peripheral device (e.g., display device 112) can also act as a hub by providing multiple USB ports (e.g., USB hub 124) to which other peripheral devices can couple. By coupling a multitude of peripheral devices to a multitude of peripheral devices that have hubs, a total of 127 peripheral devices can be attached to a single USB controller 110.

The USB controller 110 is the main component of the Universal Serial Bus architecture because it initiates all of the USB transactions. The USB controller 110 acts as a peripheral component interconnect (PCI) agent and it is a master on the PCI bus. Within the USB architecture, the peripheral devices do not have the ability to initiate any sort of transaction over the USB. In other words, there is no interrupt mechanism within the USB architecture that allows a peripheral device to request service from the USB controller 110. Instead, the USB architecture is completely polled. Polling is the act of the USB controller 110 interrogating the peripheral devices to determine which peripheral devices desire to perform transactions over the USB. The operation of the USB controller 110 is based on tables that are built into the computer system memory (e.g., RAM 106). These tables contain specific commands which the USB controller 110 interrogates. In response to these commands, the USB controller 110 initiates peripheral transactions across the Universal Serial Bus.

As part of the implementation of this polling operation, the USB architecture is based on a series of frames, which occur every millisecond (ms), that are transmitted from the USB controller 110 to the peripheral devices (e.g., alphanumeric input device 114, light gun device 116, signal generating device 118, cursor control device 120, etc.). During these 1 ms frames, the USB controller 110 interrogates specific peripheral devices to determine their status, whether or not they have anything to transfer, or whether or not they need to do anything, etc., by transmitting commands over the Universal Serial Bus. Every peripheral device can be interrogated, or polled, by the USB controller 110 during each 1 ms frame, but whether they are polled usually depends on the flnctionality of the peripheral device. There are some peripheral devices that are very slow and would not need to be interrogated by the USB controller 110 each frame.

Optionally, computer system 122 can include a display device 112 coupled to the graphics/video controller 121 for displaying information to the computer user, an alphanumeric input device 114 including alphanumeric and function keys coupled to the USB controller 110 for communicating information and command selections to the host processor 102, a USB hub 126 couple to alphanumeric input device 114 to enable other peripheral devices to be connected to the root hub 111, a cursor control device 120 coupled to the USB hub 126 for communicating user information and command selections to the host processor 102 through the USB controller 110, a signal generating device 118 coupled to the USB hub 124 for communicating command selections to the host processor 102 through the USB controller 110, a light gun device 116 coupled to the USB controller 110 for communicating user information relating to images displayed on display device 112 to the host processor 102.

Figure 2:
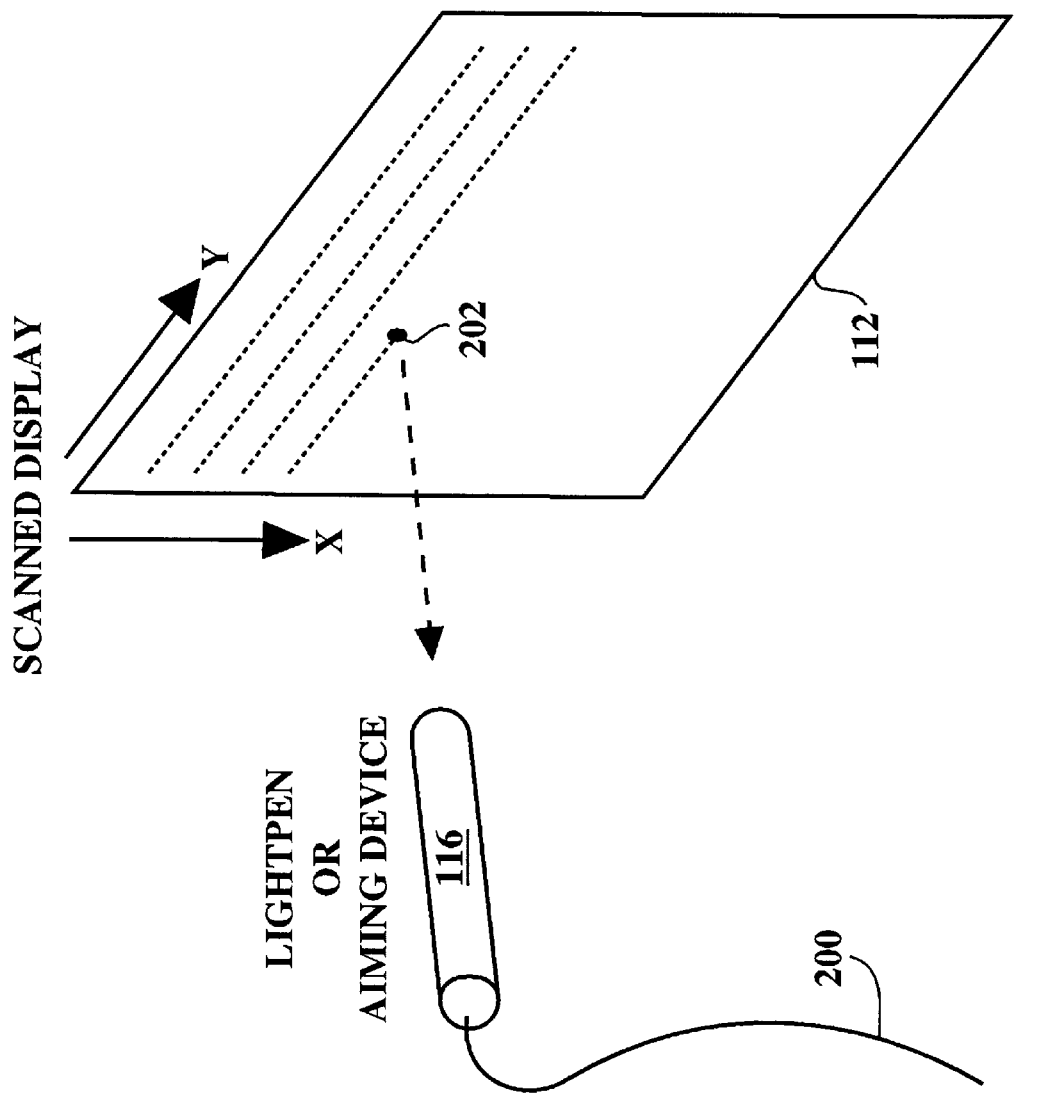
FIG. 2 shows a light gun in accordance with one embodiment of the present invention.

FIG. 2 shows a light gun in accordance with one embodiment of the present invention. Light gun 116 works in conjunction with a display screen 112. The function of the light gun 116 is closely related to the operation of the display screen 112. The average cathode ray tube display screen 112 is a scanned display where an electron beam 202 tracks horizontal lines across the phosphor of the display screen 112 and leaves behind it a bright dot. The electron beam 202 scans across the display screen 112 with a particular refresh rate (e.g., a computer screen is between 60–75 Hz) to display a sustained image on the screen 112. The light gun 116 is able to detect when the scanning beam 202 is directly underneath it because the light gun or aiming device 116 has a photoreceptor (e.g., photo sensitive diode) that detects the occurrence of the pulse of light caused by the scanning beam 202 when it is directly in front of the light gun 116. When the light gun 116 detects the scan beam 202, the (x, y) position of the scan beam 202 at that moment in time directly corresponds to where the light gun 116 is located in relation to the display screen 112.

The present invention enables real-time peripheral devices to be connected to a computer system utilizing USB architecture. The present invention provides this capability by empowering the computer system to perform an accurate determination of the moment in time, within a given accuracy, that an event occurred within a real-time peripheral device. In one embodiment, the method and system of the present invention implements a light gun (e.g., light gun 116 of FIG. 2). It should be appreciated, however, that light gun 116 is but one example of the types of real-time peripheral devices that the present invention enables to be connected to a computer system utilizing USB architecture. Other such real-time peripheral devices include, for example, a light pen, an electronic pointer, and the like.

Figure 3:
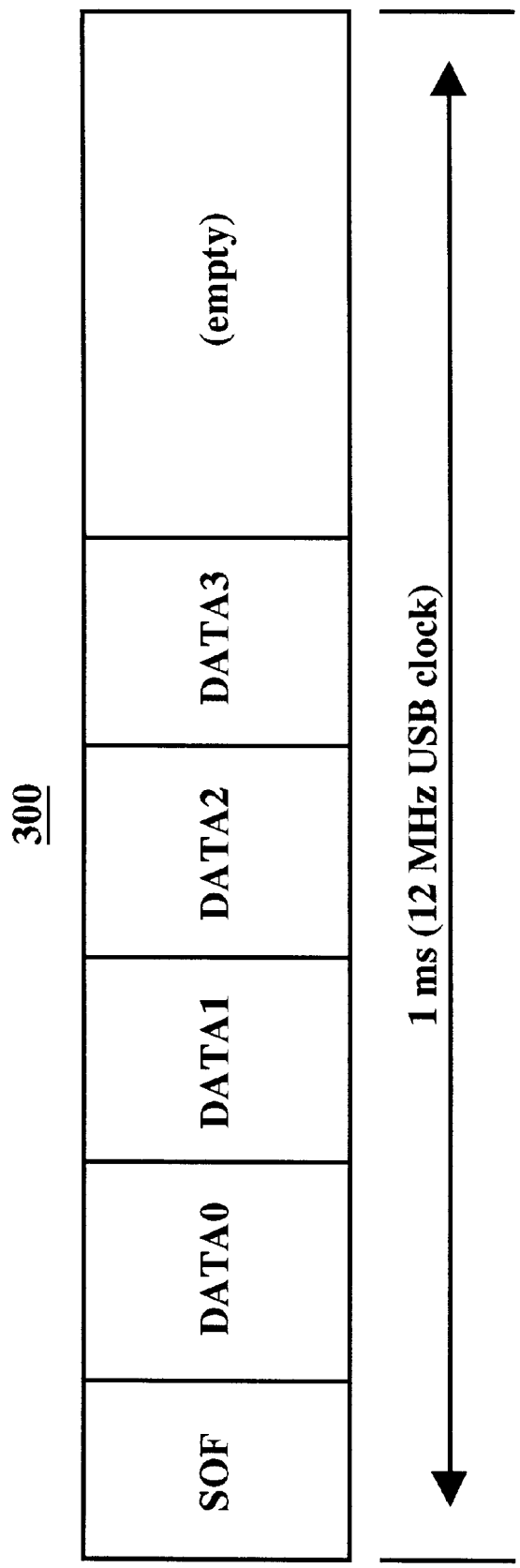
FIG. 3 shows a USB frame in accordance with one embodiment of the present invention.

Referring now to FIG. 3, a USB frame 300 is shown. USB frames comprise the basic unit of transfer within a USB system. USB frame 300 includes four data transactions, data0, data1, data2, and data3, and a start of frame message SOF. USB frame 300 is 1 ms long. Within a USB system (e.g., system 100) a plurality of USB frames are transmitted successively at 1 ms intervals.

USB frame 300 shows a sequence of data transactions, data0 through data3, which are scheduled and performed during its 1 ms interval. A USB controller (e.g., USB controller 110) is responsible for scheduling and performing the data transactions. USB controller 110 maintains a list of transfer descriptors which correspond to the coupled devices (e.g., light gun 116). USB controller 110 schedules the data transactions based upon their priority, individual data requirements, latency, etc., and subsequently links them together to form USB frames (e.g., USB frame 300). Each of data transactions data0–data3 contain an address field which is addressed for its respective device. Data is transferred serially in accordance with a 12 MHz clock (e.g., 1 bit every 83 ns). Frame 300 begins with a SOF message which identifies the frame number. The USB controller 110 tracks the frame number as it schedules and links data transactions for successive frames. Data transactions are allocated relative portions of frame 300 in accordance with their respective characteristics and requirements as described by their respective transfer descriptors. Coupled devices track SOF and the corresponding frame number of each received frame. They use the 12 MHz USB clock to sample the data from their respective transaction. Hence, the USB controller 110 generates the SOF message and data transactions data0–data3 based upon the 12 MHz USB clock. Accordingly, the USB controller 110 and each device tracks the USB frame number and the "bit count" (e.g., amount of frame remaining) of each 1 ms frame to sample and reconstruct the respective data transactions data0–data3. Coupled devices synchronize their respective bit counters with the SOF message.

Figure 4:
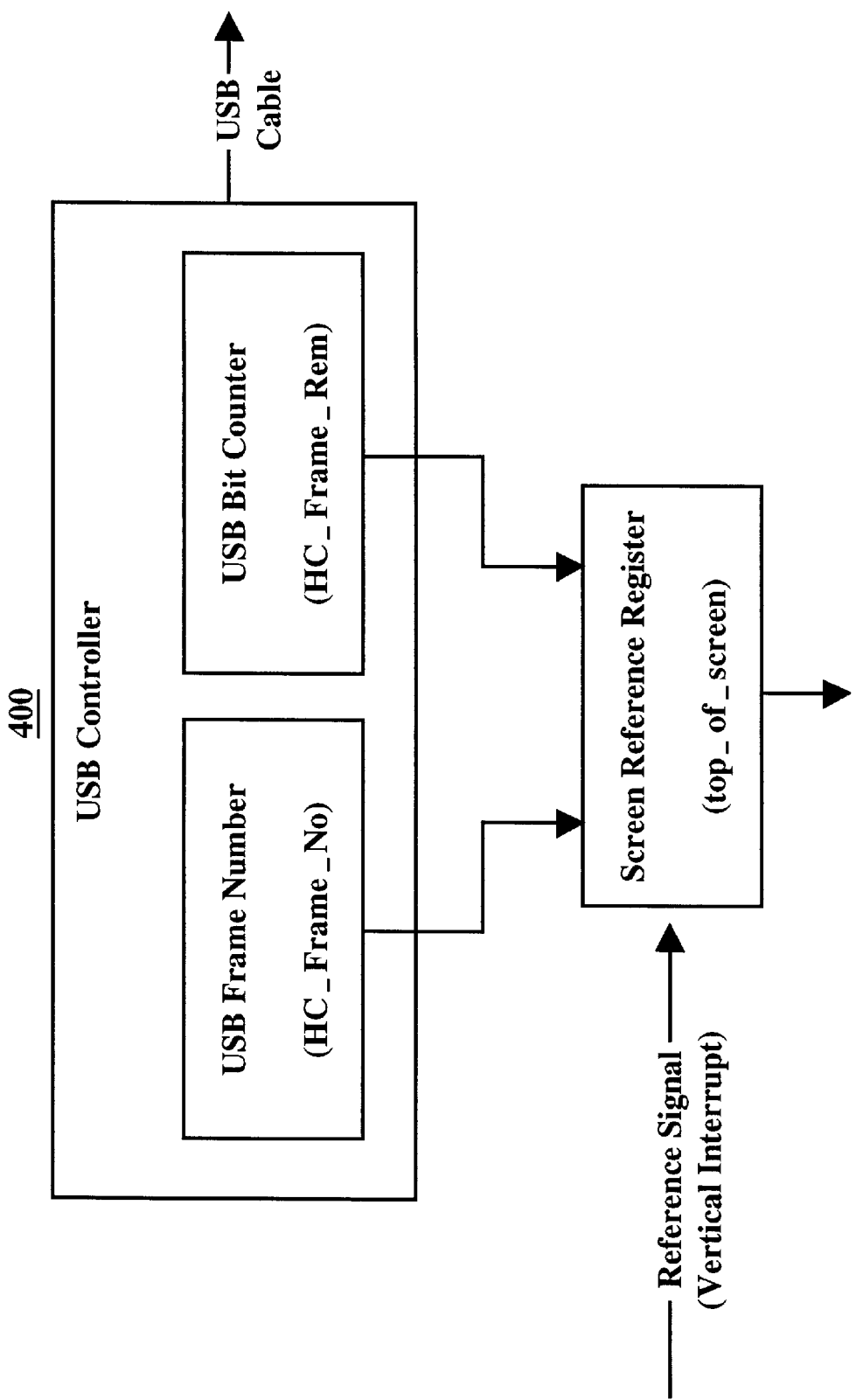
FIG. 4 shows a diagram of USB controller in accordance with one embodiment of the present invention.

With reference now to FIG. 4, a diagram of USB controller 110 in accordance with one embodiment of the present invention is shown. USB controller 110 includes a USB frame number register and a USB bit counter register. The USB frame number register tracks the frame number as the value HC_Frame_No and the USB bit counter tracks the bit count of each frame as the value HC_Frame_Rem. HG_Frame_Rem is a counter which decrements with each 12 MHz USB clock cycle. When HC_Frame_Rem expires (e.g., every 1 ms), HC_Frame_No is incremented and the next frame begins. HC_Frame_Rem and HC_Frame_No are both coupled to a screen reference register. The screen reference register is also coupled to receive a reference signal from graphics controller 121. In the present embodiment, the screen reference register functions as a latch. The instant values of HC_Frame_No and HC_Frame_Rem are latched at each occurrence of the reference signal.

In the present embodiment, the reference signal is generated from a hardware interrupt corresponding to a top-of-screen signal from graphics controller 121 (e.g., the vertical interrupt). Hence, at each vertical interrupt, HC_Frame_No and HC_Frame_Rem are latched into the screen reference register as top_of_screen. In this manner, top_of_screen represents the "USB time" with respect to HC_Frame_No and HC_Frame_Rem at which electron beam 202 is slued to the top corner of the scanned display to trace another frame of video, more often referred to as, the top of screen in USB time.

Figure 5:
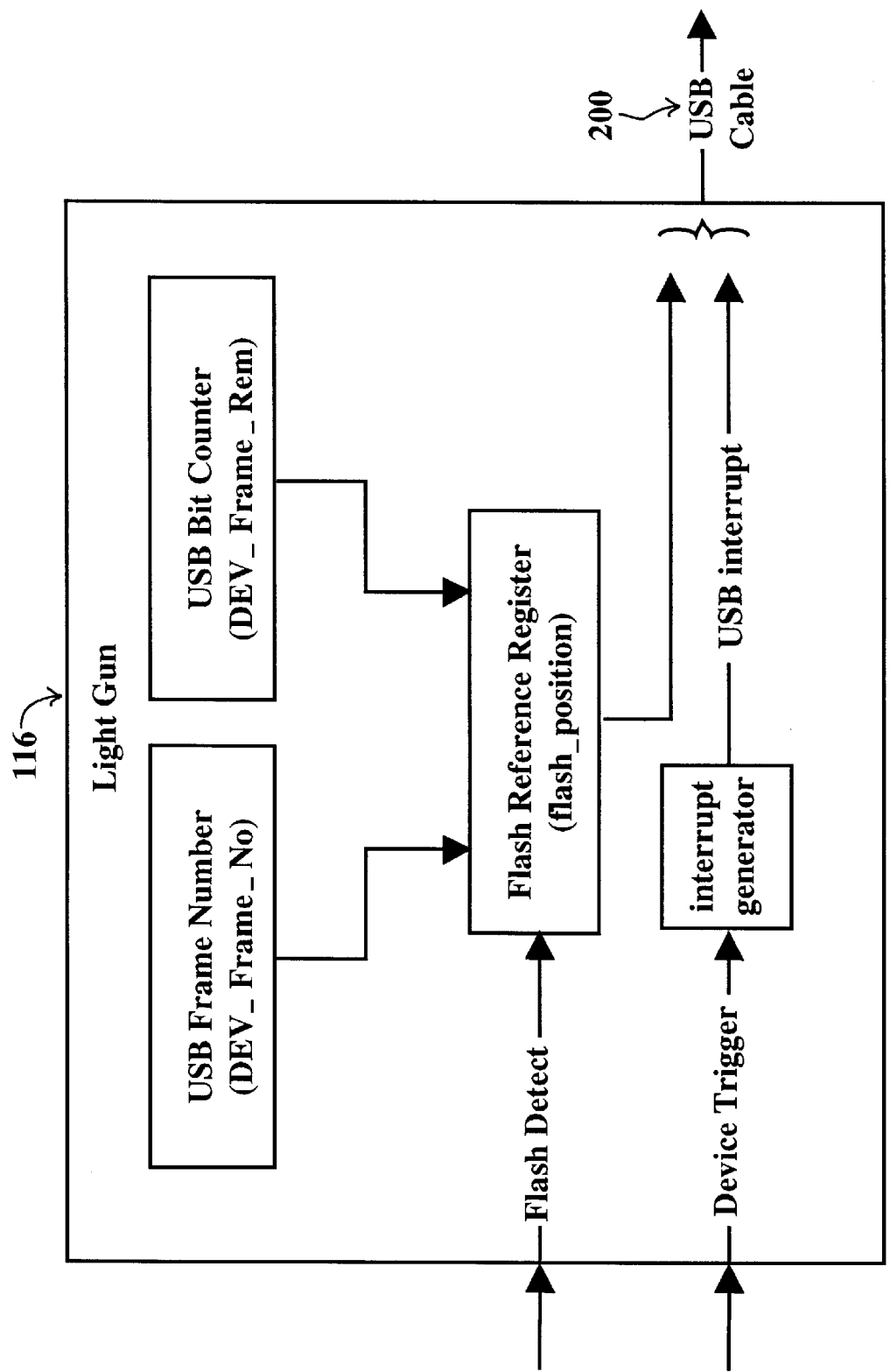
FIG. 5 shows a block diagram of a light gun in accordance with one embodiment of the present invention.

Referring now to FIG. 5, a block diagram of light gun 116 in accordance with one embodiment of the present invention is shown. As with USB controller 110, light gun 116 includes a USB frame number register and a USB bit counter register. The USB frame number register within light gun 116 stores a device frame number value, Dev_Frame_No, and the USB bit counter within light gun 116 stores a device frame remaining value, Dev_Frame_Rem. A flash reference register is coupled to receive Dev_Frame_No and Dev_Frame_Rem, and is also coupled to receive a flash detect signal from an included photoreceptor (not shown). The flash reference register functions in manner similar to the screen reference register in the USB controller. When the flash reference register receives the flash detect signal, it latches the instant values of Dev_Frame_No and Dev_Frame_Rem as the value flash_position. Flash_position represents the USB time at which the flash detect signal was received from the photoreceptor.

Light gun 116 also includes an interrupt generator coupled to receive a device trigger signal from the mechanical trigger of the light gun. In the present embodiment, when a user wishes to locate a position on screen (e.g., shoot an on screen target or select an on screen object) the user actuates the light gun's mechanical trigger. Consequently, a trigger signal is coupled to the interrupt generator, which generates a USB interrupt in response thereto. It should be appreciated that this "USB interrupt" refers to an interrupt data packet which is transmitted to the USB controller the next time light gun 116 is polled and is not to be confused with conventional, hardware supported, CPU interrupts. The USB interrupt is transmitted to the USB controller via USB cable 200. The USB interrupt and flash_position, once transmitted to USB controller 110, allow the accurate real time temporal determination of the flash detect signal, which in turn, provides for the accurate location of the position of light gun 116.

For example, during normal operation, the screen of display device 112 displays a plurality of objects, in this case, targets for an arcade style video game. When the user wishes to "shoot" a particular target, the user "aims" the light gun at a particular target and pulls the trigger. The actuation of the trigger causes the assertion of the USB interrupt by the interrupt generator. This interrupt is transmitted to the USB controller, which in turn, causes computer system 122 to display several consecutive video frames of all white screen. The all white video frames are perceived by the user as a instantaneous white flash occurring immediately upon pulling the trigger, as by analogy the flash from a "gunshot".

During the all white video frames, the electron beam 202 from FIG. 2 is at high intensity, making its clear, unambiguous detection easier for the photoreceptor of light gun 116. Each instant the electron beam scans beneath the aim point of light gun 116, the flash detect signal is sent to the flash reference register. Consequently, Dev_Frame_No and Dev_Frame_Rem are latched as flash_position in USB time and sent to USB controller 110. Upon reception of flash_position, computer system 122 can calculate the location of the aim point of light gun 116 when the trigger was actuated, and thus determine whether the target was "hit". When the computer system receives the USB interrupt representative of the trigger actuation, the software routine is alerted to, and prepares for, the forthcoming top_of_screen and flash_position, both of which are measured in a common, USB time base (e.g., USB time).

Computer system 122 determines the location of the aim point of light gun 116 by comparing flash_position with top_of_screen. In the present embodiment, a software routine (e.g., running on processor 102) compares flash_position with the most recent top_of_screen. Their relative magnitude and the sign of their sum yields the position of the aim point. If top_of screen is the smaller than flash_position, light gun 116 was triggered in the frame currently being displayed. If top_of_screen is larger than flash_position, light gun 116 was triggered in the previous frame. This can occur because of the delay reporting due to the polling nature of USB. The timing yielded by the sum of top_of_screen and flash_position allow the software routine to precisely locate the (x,y) coordinate of the aim point when the trigger was actuated. In so doing, the system of the present invention uses USB time as a general time base, which in turn, is used to correlate the timing of events within a USB device, in this case, light gun 116.

In the case, for example, where display device 112 comprises a television, the CRT of the television is refreshed at a rate of 60 video frames a second. A new video frame is generated every 1/60th of a second. Although the USB frames have a nominal period of 1 ms, this length is adjustable. To correlate the timing of events within light gun 116 with respect to the television, the adjustablility of the USB frame length is used to synchronize the USB frames with the television video frame rate in order to allow the precise position of the aim point to be determined. As described above, USB frames are 1 ms long. With a 60 frame per second video frame rate, each second has 1000 USB frames corresponding to 60 video frames. This 1000 to 60 ratio reduces to 50 to 3, allowing the USB frames to be "phased locked" to the video frames with an update every 50 ms. With a 50 Hz refresh the ratio is 1000 USB frames to 50 video frames, a 20 to 1 ratio that allows the phase to be adjusted every 20 ms.

Once the common time based is established, the software handles all calculations to determine relative position of the aim point. The USB frames are not force to be phase aligned with the video frames, but the video's vertical interrupt causes a copy of USB time to be saved (e.g., flash_position), allowing for software comparison of the vertical interrupt (in USB time) to the light gun event (e.g., flash_position), also in USB time.

It should be appreciated that time resolution (and therefore, the (x,y) position resolution) of the system of the present embodiment is related to the USB clock frequency. The clock period for low speed USB devices is 667 ns, for data sampling at 1.5 Mb per second. A single horizontal line of a television video frame, for example, is 6.51 $\mu$s. This provides for approximately 10 USB clock cycles per horizontal line, thus, allowing very fine vertical definition, but only about 5 horizontal positions with a low speed USB device. It is therefore recommended that a high speed USB device, having a USB clock period in accordance with a 12 Mb per second transmission rate, be used. This should allow resolution of approximately 40 horizontal positions and 256 vertical elements.

Figure 6:
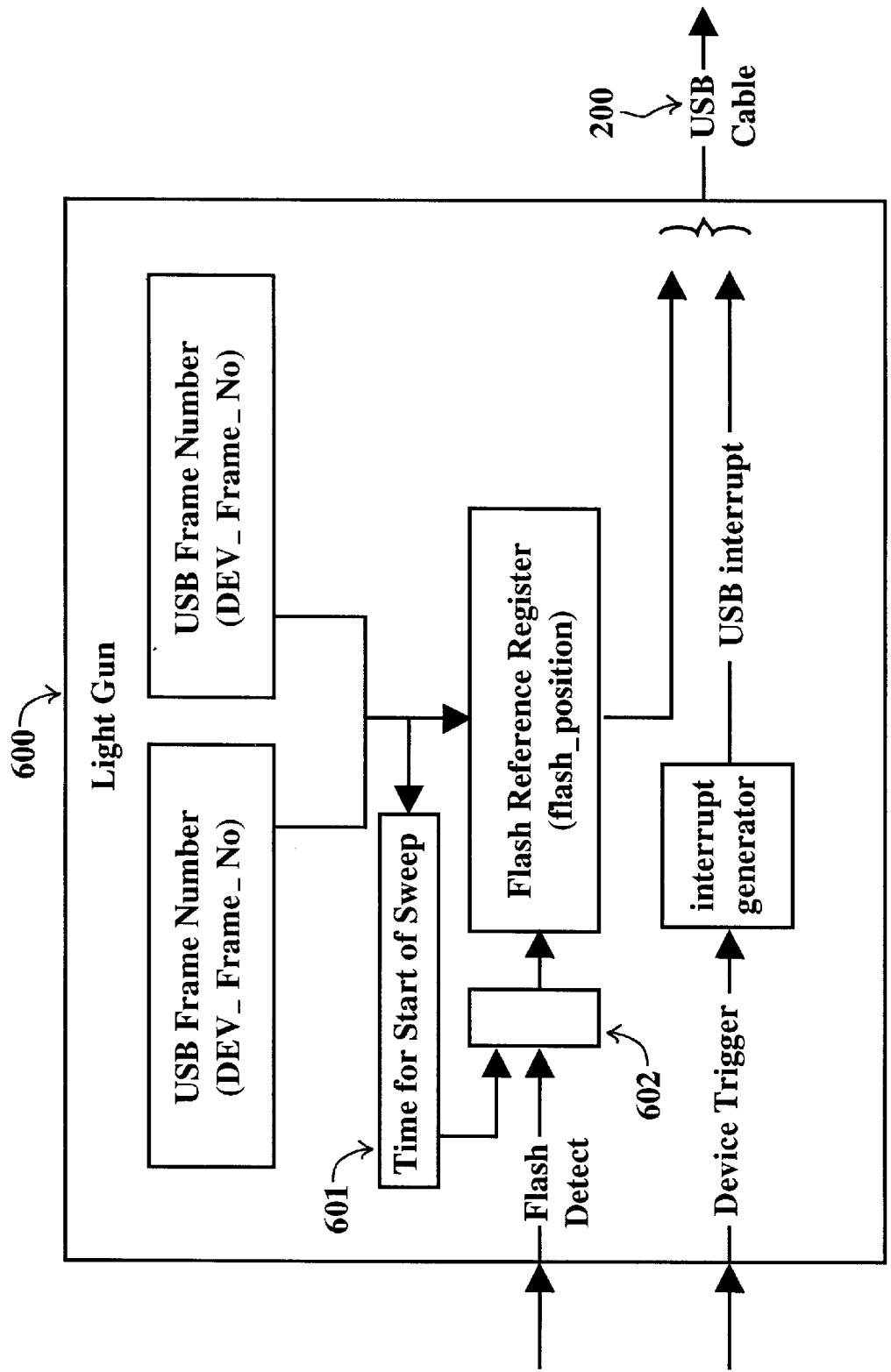
FIG. 6 shows a block diagram of a light gun in accordance with an alternate embodiment of the present invention.

Referring now to FIG. 6, a block diagram of a light gun 600 in accordance with an alternate embodiment of the present invention is shown. Light gun 600 is similar to light gun 116, except that light gun 600 further includes a register 601 and gating logic 602. Register 601 stores a time_for_start_of_sweep value and gating logic 602 selectively enables the flash detect signal coupled to the flash reference register.

In the present embodiment, when an interrupt packet from the USB interrupt is received by USB controller 110, a software routine (e.g., running on processor 102) determines the next possible screen to be resolved. The software routine then loads time_for_start_of_sweep into register 601. This time_for_start_of_sweep corresponds to a USB time coinciding with the start of a future video frame, generally, the next video frame. Where trigger actuation occurs close to the end of the current video frame, the software routine may have to skip an additional video frame.

The software routine is able to calculate the USB time for time_for_start_of_sweep due to the fact that the game program is aware of it's position within the current video frame and the screen reference register allows the software routine to accurately determine the last beginning of a video frame in USB time. Register 601 is coupled to receive Dev_Frame_No and Dev_Frame_Rem. When the Dev_Frame_No and Dev_Frame_Rem corresponds to time_for_start_of_sweep, register 601 enables gating logic 602, thereby enabling flash detection. As described above, several all white video frames are displayed to aid flash detection. The flash detect then freezes the USB time as flash_position in the flash reference register. Flash_position is subsequently forwarded to computer system 122 within a USB packet for further processing.

Alternatively, light gun 600 performs the necessary calculations using time_for_start_of_sweep, Dev_Frame_No, and Dev_Frame_Rem without utilizing processor 102. This additional processing would also allow light gun 600 to filter out errors and false inputs by comparing the results of several adjacent lines. Additionally, this would free processor time otherwise used in performing the above calculations, thus increasing processor 102 bandwidth available for other tasks.

Figure 7:
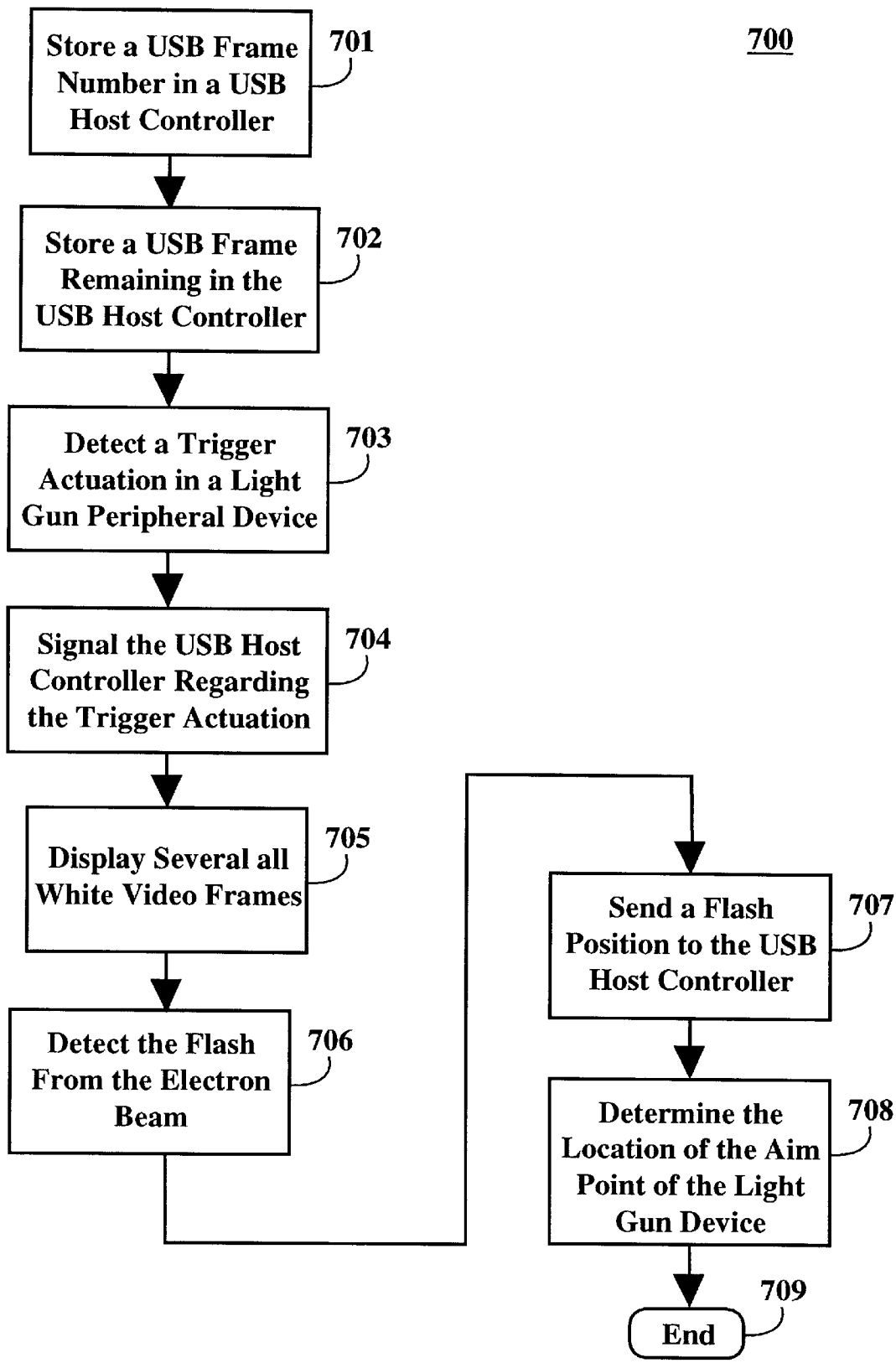
FIG. 7 shows a flow chart of the steps of a process in accordance with one embodiment of the present invention.

Referring now to FIG. 7, a flow chart of the steps of a process 700 in accordance with one embodiment of the present invention is shown. Process 700 begins in step 701, where a USB frame number is stored in a USB controller (e.g., USB controller 110). As described above, a USB frame comprises the basic unit of data transfer within a USB system. USB frames are transmitted from the USB controller at a nominal rate of one every 1 ms. Each USB frame is numbered and tracked according to the value "HC_Frame_No". HC_Frame_No is incremented successively with each transmitted USB frame. The USB controller stores the current USB frame number by storing HC_Frame_No. HC_Frame_No is stored in response to a reference signal (e.g., a vertical interrupt) from a graphics controller (e.g., graphics controller 121).

In step 702, the USB controller stores a USB frame remaining value. As described above, each USB frame is further subdivided according to a 12 MHz USB clock, where each bit of data within a frame is sampled synchronously with the period of the USB clock. A bit counter is decremented synchronously with the USB clock and is used to track the amount of frame remaining. The USB controller stores the value of this bit counter as "HC_Frame_Rem". As with HC_Frame_No, HC_Frame_Rem is stored in response to the reference signal from the graphics controller. By storing both HC_Frame_No and HC_Frame_Rem in response to receiving the reference signal, the USB controller stores the USB time of each reference signal (e.g., top_of_screen).

In step 703, process 700 detects a trigger actuation in a light gun peripheral device (e.g., light gun 116). As described above, trigger actuation by a user corresponds, by analogy, to "shooting" the light gun. Trigger actuation causes the light gun to signal the USB controller.

In step 704, the light gun signals the USB controller to communicate trigger actuation. As described above, in response to trigger actuation, the light gun sends a USB interrupt (e.g., a USB interrupt data packet) to the USB controller. This information is subsequently transmitted to a software routine (e.g., within a video game program).

In step 705, in response to trigger actuation, the software routine causes the display (e.g., display device 112) to display several all white video frames. Since a typical display device displays video at approximately 60 frames per second, the several all white frames are perceived as a bright flash, as if in response to a gun shot. The all white frames also aid in accurate flash detection.

In step 706, a photoreceptor within the light gun detects the flash from the electron beam as it scans the current video frame. The photo receptor is aligned within the light gun such that it covers the aim point of the light gun. Hence, when the electron beam scans beneath the aim point, its flash is detected by the photo receptor. This flash is used to generate a flash detect signal. As described above, in response to the flash detect signal, a Dev_Frame_No value and a Dev_Frame_Rem value are stored as a flash_position value, which represents the USB time of flash detection.

In step 707, the light gun sends flash_position to the USB controller. Since flash_position represents the USB time for flash detection and top_of_screen represents USB time for the screen reference signal (e.g., the video interrupt corresponding to top_of_screen), the system of the present invention can now determine the real time (e.g., with respect to the vertical interrupt, processor clock, software routine, or the like) of the flash detection, and thus, the location of the aim point of the light gun at trigger actuation.

In step 708, the computer system (e.g., computer system 122) determines the location of the aim point of light gun 116 by comparing flash_position with top_of_screen. As described above, the software routine (e.g., running on processor 102) compares flash_position with the most recent top_of_screen. Their relative magnitude and the sign of their sum yields the position of the aim point. The timing information yielded by the sum of top_of_screen and flash_position allow the software routine to precisely locate the (x,y) coordinate of the aim point when the trigger was actuated. In so doing, the system of the present invention uses USB time as a general time base, which in turn, is used to correlate the timing of the flash detection within light gun 116. Process 700 subsequently ends in step 709.

Thus, the present invention provides a method and system for implementing a real time capability within the USB architecture. The system of the present invention provides the USB architecture with a real-time capability in determining the actual time of the occurrence of an event within a USB peripheral device.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In a computer system having a processor, a memory, a video controller, and a USB (universal serial bus) controller coupled to a system bus for interfacing a peripheral device on a USB cable to the computer system, a system for implementing a real time capability in the peripheral device, comprising:

a USB controller having a first register for storing a controller frame number and a second register for storing a controller frame remaining;

a peripheral device having a third register for storing a device frame number and a fourth register for storing a device frame remaining, said peripheral device coupled to said USB controller via said USB cable; and a screen reference register coupled to receive said controller frame number and said controller frame remaining, said screen reference register coupled to said video controller to receive a reference signal and to store said controller frame number and said controller frame remaining in response thereto, said peripheral device transmitting said device frame number and said device frame remaining to said computer system in response to the occurrence of an event, said controller frame remaining and said controller frame number compared with said device frame remaining and said device frame number to determine a computer system time of the occurrence of said event.

2. The system of claim 1, wherein said controller frame remaining corresponds to a bit counter decremented synchronous with a USB clock signal, said bit counter decrementing to determine said controller frame number, said controller frame number corresponding to a USB frame.

3. The system of claim 1, wherein said device frame number corresponds to said controller frame number and said device frame remaining is decremented synchronous with said USB clock signal.

4. The system of claim 1, wherein said reference signal corresponds to a vertical interrupt from said video controller, said controller frame number and said controller frame remaining stored in response to said vertical interrupt as a first reference time corresponding to said vertical interrupt.

5. The system of claim 4 wherein said device frame number and said device frame remaining are stored in response to said event as a second reference time corresponding to said event.

6. The system of claim 5 wherein said computer system compares said first reference time and said second reference time to determine an event time with respect to said vertical interrupt.

7. The system of claim 6 wherein said peripheral device is a light gun and said event time is used to locate an aim point on a display coupled to said computer system.

8. In a computer system having a processor, a memory, a video controller, and a USB (universal serial bus) controller coupled to a system bus for interfacing peripheral devices on a USB cable to the computer system, a system for implementing a real time capability in at least one of the peripheral devices, comprising:

a USB controller having a first register for storing a controller frame number and a second register for storing a controller frame remaining;

a peripheral device having a third register for storing a device frame number and a fourth register for storing a device frame remaining, said peripheral device coupled to said USB controller via said USB cable; and a screen reference register coupled to receive said controller frame number and said controller frame remaining, said screen reference register coupled to said video controller to receive a reference signal and to store said controller frame number and said controller frame remaining in response thereto, said peripheral device transmitting said device frame number and said device frame remaining to said computer system in response to the occurrence of an event, said controller frame remaining and said controller frame number compared with said device frame remaining and said device frame number to determine a computer system time of the occurrence of said event.

9. The system of claim 8, wherein said controller frame remaining corresponds to a bit counter decremented synchronous with a USB clock signal, said bit counter decrementing to determine said controller frame number, said controller frame number corresponding to a USB frame.

10. The system of claim 8, wherein said device frame number corresponds to said controller frame number and said device frame remaining is decremented synchronous with said USB clock signal.

11. The system of claim 8, wherein said peripheral device further includes a gating logic circuit for gating an event signal representative of said event, said device frame number and said device frame remaining stored in response to said event signal.

12. The system of claim 11, wherein said peripheral device further includes a fifth register for storing a time for starting a sweep, said time for starting a sweep coupled to control said gating logic circuit such that said event signal is coupled to said fifth register in accordance with said time for starting a sweep.

13. The system of claim 12, wherein said reference signal corresponds to a vertical interrupt from said video controller, said controller frame number and said controller frame remaining stored in response to said vertical interrupt as a first reference time corresponding to said vertical interrupt.

14. The system of claim 13 wherein said device frame number and said device frame remaining are stored in response to said event as a second reference time corresponding to said event.

15. The system of claim 14 wherein said computer system compares said first reference time and said second reference time to determine an event time with respect to said vertical interrupt.

16. The system of claim 15 wherein said peripheral device is a light gun and said event time is used to locate an aim point on a display coupled to said computer system.

17. In a computer system having a processor, a memory, a video controller, and a USB (universal serial bus) controller coupled to a system bus, a method for implementing a real time capability in a USB peripheral device, the method comprising the steps of:

a) storing a controller frame number in a USB controller;
b) storing a controller frame remaining in said USB controller;
c) detecting an event in a peripheral device;
d) storing a device frame number in said peripheral device in response to said event;
e) storing a device frame remaining in said peripheral device in response to said event;
f) transmitting said device frame number and said device frame remaining to said USB controller; and,
g) comparing said device frame number and said device frame remaining with said controller frame number and said controller frame remaining to determine a reference time for said event with respect to said computer system.

18. The method of claim 17 wherein step g) further includes determining said reference time for said event with respect to a screen reference signal from a display coupled to said computer system.

19. The method of claim 18 further including the step of computing a display screen location of an aim point using said reference time wherein said peripheral device is a light gun and said screen reference signal is a vertical interrupt.

* * * * *